(12) United States Patent
Zhu et al.

(10) Patent No.: US 11,510,209 B2
(45) Date of Patent: Nov. 22, 2022

(54) OVERHEATING TRIGGERED RADIO RESOURCE MANAGEMENT (RRM) RELAXATION

(71) Applicant: QUALCOMM Incorporated, San Diego, CA (US)

(72) Inventors: Xipeng Zhu, San Diego, CA (US); Sharda Ranjan, Hyderabad (IN); Naga Chandan Babu Gudivada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/152,999

(22) Filed: Jan. 20, 2021

(65) Prior Publication Data

US 2022/0232550 A1    Jul. 21, 2022

(51) Int. Cl.
  *H04W 72/04*    (2009.01)
(52) U.S. Cl.
  CPC ..... *H04W 72/048* (2013.01); *H04W 72/0406* (2013.01)
(58) Field of Classification Search
  None
  See application file for complete search history.

(56) References Cited

U.S. PATENT DOCUMENTS

| | | | | |
|---|---|---|---|---|
| 2015/0139113 A1* | 5/2015 | You | .................. | H04L 5/0048 370/329 |
| 2020/0351746 A1* | 11/2020 | Jia | .................. | H04W 36/0072 |
| 2020/0359247 A1* | 11/2020 | Yi | .................. | H04W 80/02 |
| 2021/0392716 A1* | 12/2021 | Kim | .................. | H04L 5/0094 |
| 2022/0007293 A1* | 1/2022 | Kaikkonen | .......... | H04W 76/28 |

FOREIGN PATENT DOCUMENTS

EP    3908032 A1 * 11/2021    .......... H04B 17/309

* cited by examiner

*Primary Examiner* — Hong S Cho
(74) *Attorney, Agent, or Firm* — Holland & Hart, LLP

(57) ABSTRACT

Methods, systems, and devices for wireless communications are described. In some wireless communications systems, a user equipment (UE) may determine that its operating temperature exceeds an overheating condition threshold temperature, reducing overall device performance. To address the overheating condition, the UE may transmit an uplink control message containing UE assistance information to request a reconfiguration of one or more measurement parameters. In some cases, the UE may request to reduce one or more measurements associated with radio resource management (RRM). The UE may receive a downlink control message from a base station which indicates a reconfiguration of the measurement parameters, and the UE may implement the reconfiguration to mitigate the overheating.

28 Claims, 15 Drawing Sheets

OVERHEATING TRIGGERED RADIO RESOURCE MANAGEMENT (RRM) RELAXATION

FIELD OF TECHNOLOGY

The following relates to wireless communications, including overheating triggered radio resource management (RRM) relaxation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may overheat in some cases due to various power consuming operations performed while communicating in a wireless communications system. Conventional techniques for mitigating such overheating, however, may be deficient.

SUMMARY

The described techniques relate to improved methods, systems, devices, and apparatuses that support overheating triggered radio resource management (RRM) relaxation. In some wireless communications systems, operations at a user equipment (UE) may cause the UE to overheat, thus reducing performance and battery life of the device. To mitigate the overheating, the UE may request overheating assistance by transmitting an uplink control message containing UE assistance information to a base station. In some cases, the UE assistance information may indicate a request to reconfigure one or more measurement parameters, for example, a request to reduce measurements associated with radio resource management (RRM).

The UE may request to reduce RRM measurements using an RRM relaxation information element included in the uplink control message. For example, the UE may request to reduce a number of measurement objects (e.g., cells) that it is expected to measure during RRM measurement. In some examples, the UE may request to refrain from performing measurements on intra-frequency cells or inter-frequency cells. In some other examples, the UE may request to reduce the frequency that the RRM measurements are performed, or the UE may request a measurement scaling factor to decrease or increase RRM measurements.

A method for wireless communications at a user equipment (UE) is described. The method may include determining that an operating temperature of the UE exceeds an overheating condition threshold temperature, transmitting, to a base station, an uplink control message indicating a request to reconfigure one or more measurement parameters based on the operating temperature, and receiving, from the base station, a downlink control message indicating a reconfiguration of the one or more measurement parameters.

An apparatus for wireless communications at a UE is described. The apparatus may include a processor, memory in electronic communication with the processor, and instructions stored in the memory. The instructions may be executable by the processor to cause the apparatus to determine that an operating temperature of the UE exceeds an overheating condition threshold temperature, transmit, to a base station, an uplink control message indicating a request to reconfigure one or more measurement parameters based on the operating temperature, and receive, from the base station, a downlink control message indicating a reconfiguration of the one or more measurement parameters.

Another apparatus for wireless communications at a UE is described. The apparatus may include means for determining that an operating temperature of the UE exceeds an overheating condition threshold temperature, means for transmitting, to a base station, an uplink control message indicating a request to reconfigure one or more measurement parameters based on the operating temperature, and means for receiving, from the base station, a downlink control message indicating a reconfiguration of the one or more measurement parameters.

A non-transitory computer-readable medium storing code for wireless communications at a UE is described. The code may include instructions executable by a processor to determine that an operating temperature of the UE exceeds an overheating condition threshold temperature, transmit, to a base station, an uplink control message indicating a request to reconfigure one or more measurement parameters based on the operating temperature, and receive, from the base station, a downlink control message indicating a reconfiguration of the one or more measurement parameters.

Some examples of the method, apparatuses, and non-transitory computer-readable medium described herein may further include operations, features, means, or instructions for transmitting, to the base station, a capability of the UE to support radio resource management relaxation-based overheating assistance mitigation.

In some examples of the method, apparatuses, and non-transitory computer-readable medium described herein, the uplink control message includes a field indicating a reason that the UE requests the reconfiguration of the one or more measurement parameters.

In some examples of the method, apparatuses, and non-transitory computer-readable medium described herein, the field indicating the reason includes an indication that the UE may have exceeded the overheating condition threshold temperature or a non-thermal mitigation request to reduce measurements.

In some examples of the method, apparatuses, and non-transitory computer-readable medium described herein, the request to reconfigure the one or more measurement parameters further includes a request to reduce a number of measurement objects that may be measured by the UE.

In some examples of the method, apparatuses, and non-transitory computer-readable medium described herein, the number of measurement objects include one or more intra-frequency cells or inter-frequency cells or inter-RAT cells configured for monitoring by the UE.

In some examples of the method, apparatuses, and non-transitory computer-readable medium described herein, the number of measurement objects may be configured based on an associated radio access technology.

In some examples of the method, apparatuses, and non-transitory computer-readable medium described herein, the request to reconfigure the one or more measurement parameters further includes a request to reduce a periodicity of measurement based on the operating temperature.

In some examples of the method, apparatuses, and non-transitory computer-readable medium described herein, the request to reconfigure the one or more measurement parameters may include operations, features, means, or instructions for scaling the one or more measurement parameters in accordance with a measurement scaling factor.

In some examples of the method, apparatuses, and non-transitory computer-readable medium described herein, the uplink control message includes a UE assistance information message.

In some examples of the method, apparatuses, and non-transitory computer-readable medium described herein, the request to reconfigure the one or more measurement parameters includes a radio resource management relaxation information element.

Some examples of the method, apparatuses, and non-transitory computer-readable medium described herein may further include operations, features, means, or instructions for determining that the operating temperature of the UE may be less than the overheating condition threshold temperature and transmitting, to the base station, a second uplink control message indicating that the UE may have recovered from overheating.

A method for wireless communications at a base station is described. The method may include receiving, from a UE an uplink control message indicating a request to reconfigure one or more measurement parameters based on an operating temperature of the UE that exceeds an overheating condition threshold temperature and transmitting a downlink control message indicating a reconfiguration of the one or more measurement parameters in accordance with the request.

An apparatus for wireless communications at a base station is described. The apparatus may include a processor, memory in electronic communication with the processor, and instructions stored in the memory. The instructions may be executable by the processor to cause the apparatus to receive, from a UE an uplink control message indicating a request to reconfigure one or more measurement parameters based on an operating temperature of the UE that exceeds an overheating condition threshold temperature and transmit a downlink control message indicating a reconfiguration of the one or more measurement parameters in accordance with the request.

Another apparatus for wireless communications at a base station is described. The apparatus may include means for receiving, from a UE an uplink control message indicating a request to reconfigure one or more measurement parameters based on an operating temperature of the UE that exceeds an overheating condition threshold temperature and means for transmitting a downlink control message indicating a reconfiguration of the one or more measurement parameters in accordance with the request.

A non-transitory computer-readable medium storing code for wireless communications at a base station is described. The code may include instructions executable by a processor to receive, from a UE an uplink control message indicating a request to reconfigure one or more measurement parameters based on an operating temperature of the UE that exceeds an overheating condition threshold temperature and transmit a downlink control message indicating a reconfiguration of the one or more measurement parameters in accordance with the request.

Some examples of the method, apparatuses, and non-transitory computer-readable medium described herein may further include operations, features, means, or instructions for receiving, from the UE, a capability of the UE to support radio resource management relaxation-based overheating assistance mitigation.

In some examples of the method, apparatuses, and non-transitory computer-readable medium described herein, the uplink control message includes a field indicating a reason that the UE requests the reconfiguration of the one or more measurement parameters.

In some examples of the method, apparatuses, and non-transitory computer-readable medium described herein, the field indicating the reason includes an indication that the UE may have exceeded the overheating condition threshold temperature or a non-thermal mitigation request to reduce measurements.

In some examples of the method, apparatuses, and non-transitory computer-readable medium described herein, the reconfiguration of the one or more measurement parameters further includes an indication to reduce a number of measurement objects that may be measured by the UE.

In some examples of the method, apparatuses, and non-transitory computer-readable medium described herein, the number of measurement objects include one or more intra-frequency cells or inter-frequency cells configured by the base station for monitoring by the UE.

In some examples of the method, apparatuses, and non-transitory computer-readable medium described herein, the number of measurement objects may be configured by the base station based on a radio access technology supported by the base station.

In some examples of the method, apparatuses, and non-transitory computer-readable medium described herein, the reconfiguration of the one or more measurement parameters further includes an indication to reduce a periodicity of measurement based on the operating temperature.

In some examples of the method, apparatuses, and non-transitory computer-readable medium described herein, the reconfiguration of the one or more measurement parameters further includes a measurement scaling factor to scale the one or more measurement parameters at the UE.

In some examples of the method, apparatuses, and non-transitory computer-readable medium described herein, the downlink control message further includes one or more overheating assistance parameters indicating a reduced bandwidth, a reduced number of multiple-input multiple-output layers, a reduced number of component carriers, or any combination thereof.

In some examples of the method, apparatuses, and non-transitory computer-readable medium described herein, the uplink control message includes a UE assistance information message.

In some examples of the method, apparatuses, and non-transitory computer-readable medium described herein, the reconfiguration of the one or more measurement parameters includes a radio resource management relaxation information element.

Some examples of the method, apparatuses, and non-transitory computer-readable medium described herein may further include operations, features, means, or instructions for receiving, from the UE, a second uplink control message indicating that the UE may have recovered from overheating.

DETAILED DESCRIPTION

Figure 1:
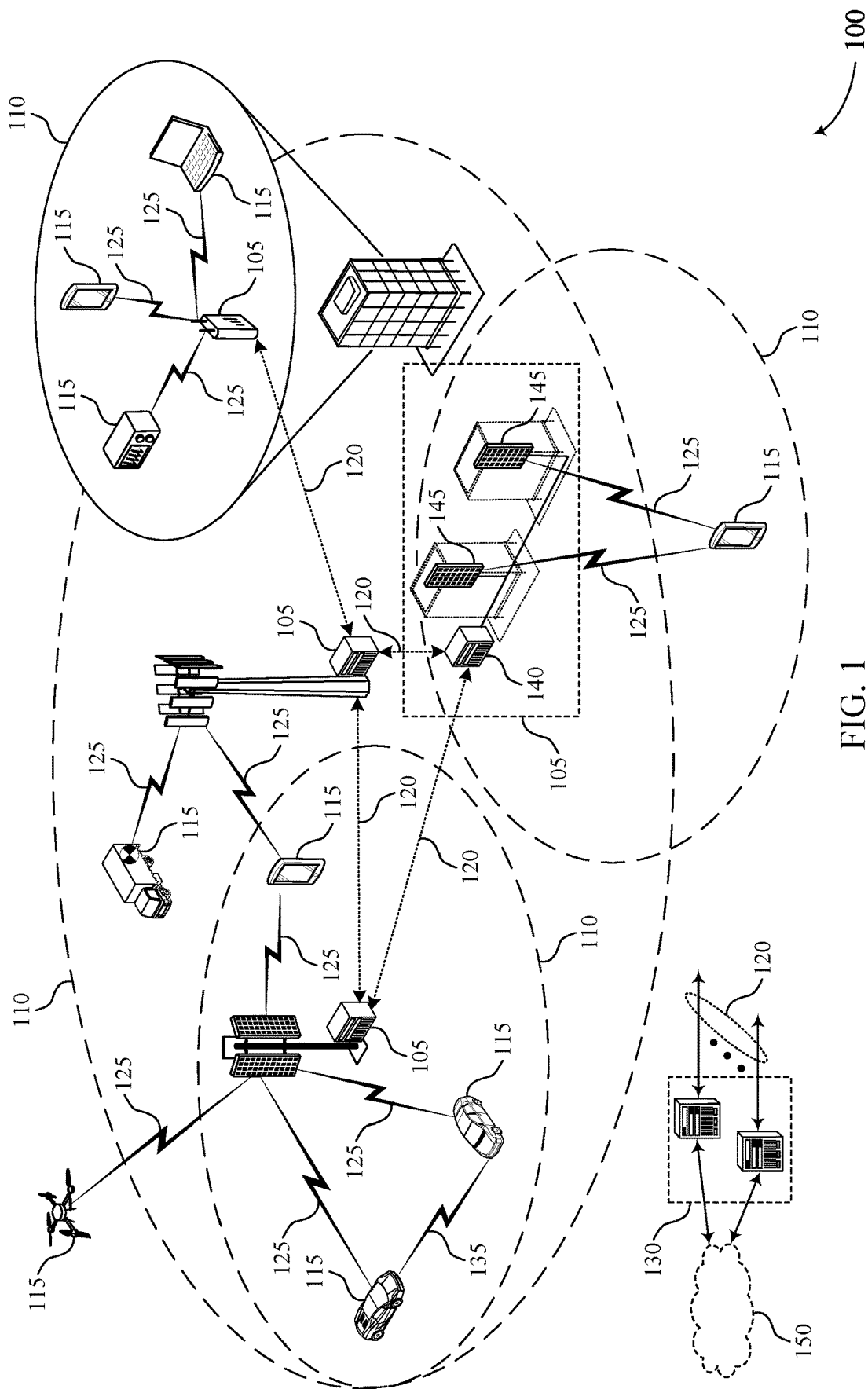
FIG. 1 illustrates an example of a wireless communications system that supports overheating triggered radio resource management (RRM) relaxation in accordance with aspects of the present disclosure.

In some wireless communications systems, a user equipment (UE) may be configured to support high data throughput and low latency transmissions in addition to a number of other processes that drive high power consumption at the UE. In some cases, however, such operations may cause the UE to overheat, thus reducing performance and battery life of the device. To mitigate the overheating, the UE may request overheating assistance by transmitting uplink control information (e.g., a radio resource control message (RRC)) containing a UE assistance information message (e.g., UEAssistanceInformation) to the network. In some cases, the UE may format the UE assistance information to contain a request for general overheating assistance, and in some cases the UE may include an information element which requests a reduction in measurements performed by the UE during radio resource management (RRM).

During RRM, the UE may periodically measure the quality of received signals, such as Reference Signal Received Power (RSRP) or Reference Signal Received Quality (RSRQ). In some cases, however, performing RRM consumes power and may cause or at least contribute to overheating due to excessive measurements, and the UE may determine that temporarily reducing RRM measurements (e.g., RRM relaxation) may mitigate the overheating. The UE may format the RRM relax request as an RRM relaxation information element in the UE assistance information RRC message.

In some examples, the RRM relaxation information element may include a request to reduce the number of measurement objects that the UE is configured to measure during RRM measurement. For example, the UE may request to reduce the number of measurement objects (e.g., cells) that it is configured to measure on a given carrier frequency. In some examples, the RRM relaxation information element may include a request to skip measurements on intra-frequency cells or inter-frequency cells. Additionally or alternatively, in some examples the UE may request to perform the RRM measurements less frequently, or the UE may request a measurement scaling factor such that the UE may effectively decrease or increase RRM measurements in accordance with the scaling factor and based on the operating temperature.

The UE may transmit the RRM relaxation request to the network, and the network may reconfigure the RRM measurements that the UE is expected to perform. The UE may receive a message from the network which accommodates a reduction in RRM measurements to assist mitigation of the overheating.

Particular aspects of the subject matter described herein may be implemented to realize one or more advantages. The described techniques may support improvements in techniques for a UE to recover from overheating. In some examples, the techniques may allow for an additional technique to reduce operating temperature by requesting a reduction in power intensive RRM measurement. In addition, the techniques may increase the reliability of the UE and may extend battery life of the UE. For example, the UE may identify an overheating event and provide a request to mitigate the overheating. Further, the techniques described herein may allow for increased throughput and efficiency in the wireless communications system.

Aspects of the disclosure are initially described in the context of wireless communications systems, such as those supporting UE-initiated overheating assistance mitigation. Aspects of the disclosure are further illustrated by and described with reference to apparatus diagrams, system diagrams, a process flow, and flowcharts that relate to overheating triggered RRM relaxation.

FIG. 1 illustrates an example of a wireless communications system 100 that supports overheating triggered RRM relaxation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, however, operating demands at the UE 115 may cause an operating temperature of the UE 115 to exceed a threshold, thus leading to overheating of the UE 115. To mitigate the overheating, the UE 115 may request overheating assistance by transmitting a control message (e.g., an RRC message) containing a UE assistance information to a base station 105. In some cases, the UE 115 may request general overheating assistance configured by the base station 105, or in some other cases the UE 115 may include an information element in the UE assistance information which requests a reduction in measurement operations (e.g., a reduction in RRM measurements).

In some examples, the UE 115 may determine that temporarily reducing RRM measurements (e.g., RRM relaxation) may mitigate the overheating, and the UE 115 may request modification of various RRM measurement parameters to reduce the operating temperature of the UE 115. For example, the UE 115 may request to reduce the number of measurement objects (e.g., cells) measured during RRM measurement. In some examples, the UE 115 may request to skip measurements on intra-frequency cells or inter-frequency cells. Additionally or alternatively, the UE 115 may request to reduce the frequency that the RRM measurements are performed, or the UE 115 may request a measurement scaling factor to decrease or increase RRM measurements in accordance with the scaling factor.

Figure 2:
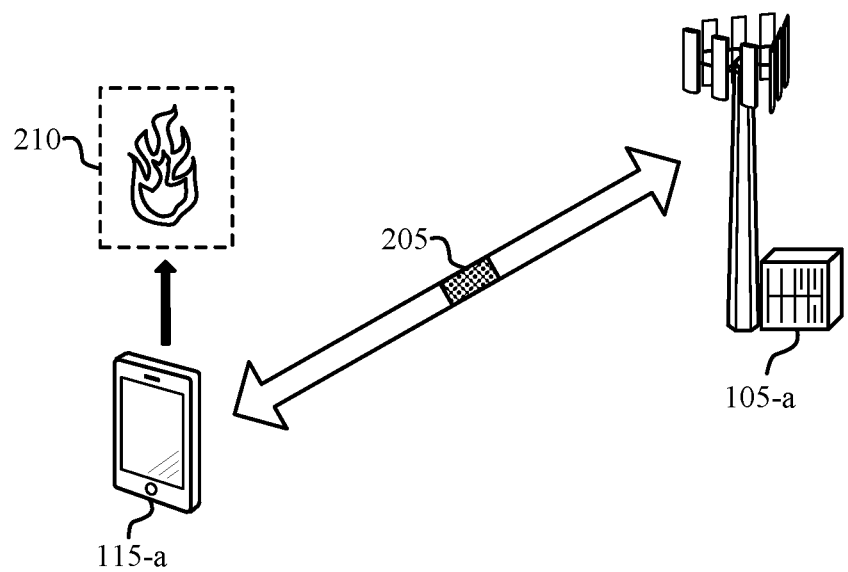
FIG. 2 illustrates an example of a wireless communication system that supports overheating triggered RRM relaxation in accordance with aspects of the present disclosure.

FIG. 2 illustrates an example of a wireless communications system 200 that supports overheating triggered RRM relaxation in accordance with aspects of the present disclosure. For example, wireless communications system 200 may support communications between a base station 105-a and a UE 115-a, which may be examples of a base station 105 and a UE 115 described with reference to FIG. 1.

To meet demand for low latency and high throughput communications, a UE 115-a may perform wireless transmissions using techniques such as high-order Multiple-Input Multiple-Output (MIMO), multi-carrier aggregation, and high-order modulation decoding. In some cases, however, such high-speed wireless transmission may cause the UE 115-a to overheat, causing interrupted transmission of service data and reduced performance. To identify an overheating event 210, the UE 115-a may identify that its operating temperature exceeds a threshold temperature (e.g., an overheating threshold condition temperature).

To mitigate the overheating, the UE 115-a may be configured to request overheating assistance by transmitting uplink control information 205 (e.g., a radio resource control message (RRC)) containing a UE assistance information message (e.g., UEAssistanceInformation). Further, in some cases the UE assistance information may contain an information element which includes a request for the UE to reduce measurements or other power-consuming operations. For example, the UE 115-a may include a request to temporarily reduce a number of secondary component carriers monitored by the UE 115-a when the UE 115-a is operating in accordance with a dual connectivity/non-standalone architecture. In some examples, the UE 115-a may include a request to reduce the maximum aggregated bandwidth (e.g., for FR1 or FR2) and the number of maximum MIMO layers.

In some examples, the UE 115-*a* may format the overheating assistance information to include an information element which requests to reduce radio resource management (RRM) measurements performed by the UE 115-*a*. As part of an RRM procedure, the UE 115-*a* periodically measures the quality of received signals, such as Reference Signal Received Power (RSRP) or Reference Signal Received Quality (RSRQ) as part of RRM. Performing such RRM measurements, however, consumes power and may affect the operating temperature of the UE 115-*a* due to increased usage.

In some examples, the UE 115-*a* may determine that reducing RRM measurements may aid in mitigation of overheating, and the UE 115-*a* may request RRM relaxation as part of the UE overheating assistance. In some examples, the RRM relaxation may include a request by the UE 115-*a* to reduce measurement sampling, or to reduce the number of measurement objects (e.g., cells) that the UE 115-*a* is configured to measure. In some examples, the RRM relaxation information element may include a request to increase the measurement interval or to increase a threshold associated with triggering the RRM measurement (e.g., the triggering threshold may be increased such that the UE 115-*a* is prompted to perform RRM measurements less frequently).

The UE 115-*a* may format the RRM relax request in the UE assistance information RRC message. For example, the RRM relax request may be and additional information element included in the UE assistance information (e.g., overheating assistance), given by:

```
UEAssistanceInformation-v17xy-IEs::= SEQUENCE {
    rrmRelax-Assistance-r17         RRXRelax-Assistance-R17
    OPTIONAL
    nonCriticalExtension    SEQUENCE { }        OPTIONAL
}
RRMRelax-Assistance-R17::= SEQUENCE {
relaxReason                 ENUMERATED{overheating,
non-thermal mitigation, user-preferred . . . },
reducedMaxMeasObjects -FR1 INTEGER,
reducedMaxMeasObjects -FR2 INTEGER,
Intra-FMeas BOOLEAN,
Inter-FMeas BOOLEAN,
RelaxFactor                 ENUMERATED{2,3,5,10 . . . }
}
```

The RRM relaxation information element may include a reason field (e.g., relaxReason or an RRM relax mode) which indicates a reason that the UE 115-*a* is requesting RRM relaxation. For example, the reason field may indicate that the UE 115-*a* is requesting RRM relaxation due to overheating, or that the UE 115-*a* is requesting RRM relaxation for non-thermal mitigation (e.g., to reduce power consumption or processor usage, or to reduce RRM to prevent overheating of the UE 115-*a*). In some other examples, the reason field may indicate a user-preferred request (e.g., a user may manually enable a power saving mode of the UE 115-*a*).

In some examples, the RRM relaxation information element may include a request to reduce the number of measurement objects that the UE 115-*a* is configured to measure for RRM measurement. For example, the UE 115-*a* may request to reduce the number of cells that it is configured to measure on a given carrier frequency (e.g., FR1, FR2). The UE 115-*a* may identify a preference for which measurement objects to reduce, or the UE 115-*a* may indicate a range or maximum number of reduced measurement objects for each carrier frequency (e.g., reducedMaxMeasObjects—FR1, reducedMaxMeasObjects—FR2). In some examples, the number of measurement objects may be defined according to different radio access technologies (RATs), for example, a different number of measurement objects may be configured for a 5G/NR system, a sub6/mmWave system, or a different number for different RATs.

In some examples, the RRM relaxation information element may include a request to skip measurements (e.g., refrain from measurements) on intra-frequency cells, inter-frequency cells, or inter-RAT E-UTRAN cells (e.g., using TRUE or FALSE values in the information element to indicate a measurement occasion or a skipped measurement) to reduce processing overhead and reduce operating temperature. In some cases, the base station 105-*a* may configure more intra-frequency cells for the UE 115-*a* to measure. Additionally or alternatively, the UE 115-*a* may request to perform the measurements in larger time intervals, thus reducing the frequency in which the UE 115-*a* performs RRM measurements.

The RRM relaxation information element may include an indication of an RRM relaxation scaling factor which the UE 115-*a* may use to adjust (e.g., reduce or increase) the number or RRM measurements performed. For example, the UE 115-*a* may select an RRM scaling factor from a range of scaling factors (e.g., {2, 3, 5, 10, etc.}), and may apply the scaling factor to decrease RRM measurements in accordance with the scaling factor. In some cases, the UE 115-*a* may request to increase RRM measurements (by applying a scaling factor) upon determining that the operating temperature of the UE 115-*a* has decreased below a threshold.

Upon receiving the UE information assistance message including the RRM measurement reduction information element, the base station 105-*a* may reconfigure the RRM measurements that the UE 115-*a* is expected to perform in order to accommodate the overheating assistance request. In some cases, the base station 105-*a* may determine to accommodate the full request included in the RRM measurement reduction information element, or the base station 105-*a* may accommodate a portion of the request based on various factors (e.g., network conditions, reliability targets, etc.). The UE 115-*a* may receive an indication from the base station 105-*a* to reduce RRM measurements to assist mitigation of the overheating.

Once the operating temperature of the UE 115-*a* is reduced below the overheating threshold temperature, the UE 115-*a* may send another overheating assistance message to the base station 105-*a* with the original parameters of the message to notify the base station 105-*a* that the UE 115-*a* has recovered from overheating and is ready to resume full RRM measurement. In some other cases, the UE 115-*a* may send an empty overheating assistance message to the base station 105-*a* to indicate the overheating recovery.

Figure 3:
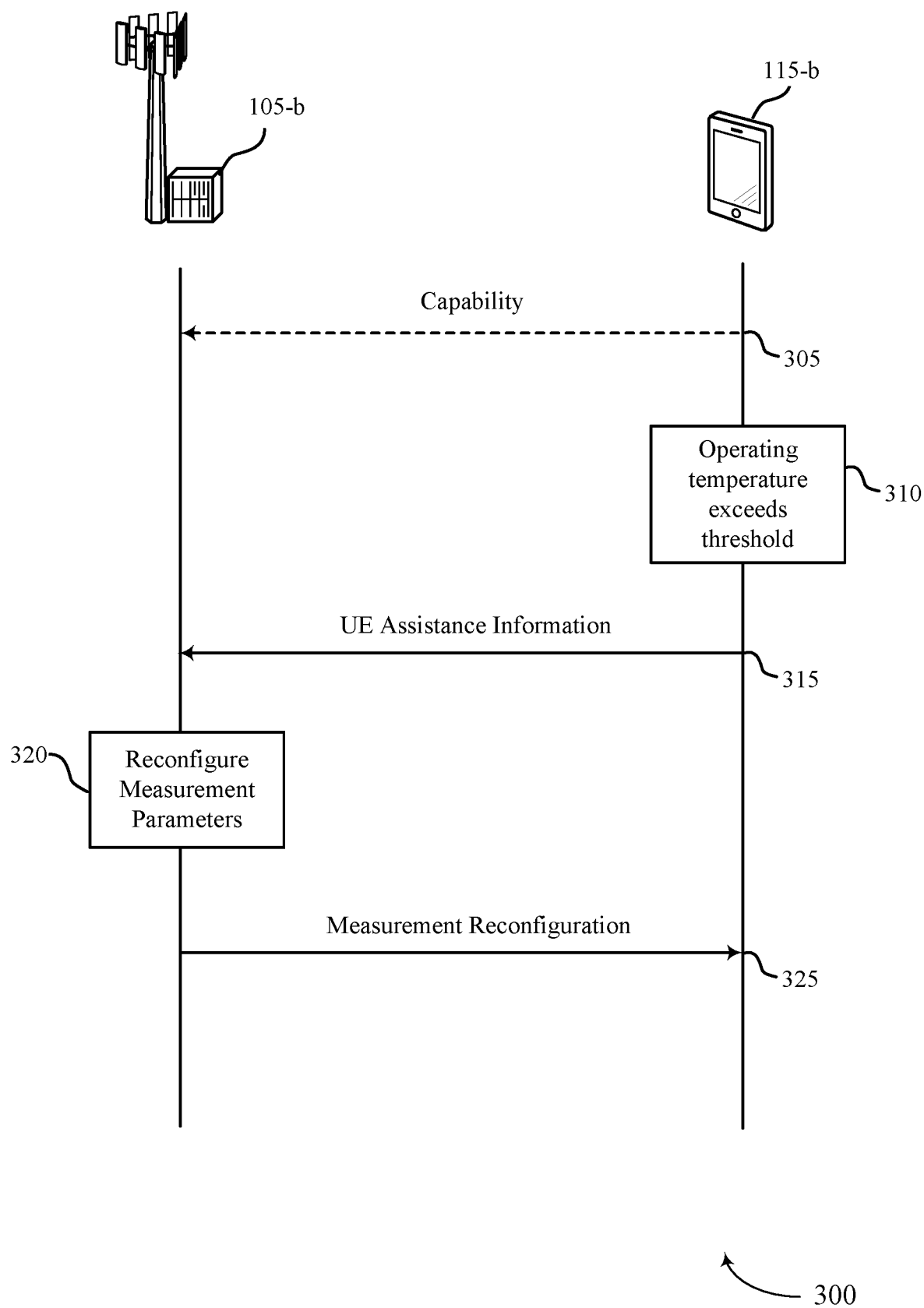
FIG. 3 illustrates an example of a process flow that supports overheating triggered RRM relaxation in accordance with aspects of the present disclosure.

FIG. 3 illustrates an example of a process flow 300 that supports overheating triggered RRM relaxation in accordance with aspects of the present disclosure. In some examples, process flow 300 may implement aspects of wireless communication systems 100 and 200. The process flow 300 includes UE 115-*b* and base station 105-*b*, which may be examples of the corresponding devices described with reference to FIGS. 1-2. Alternative examples of the following may be implemented, where some steps are performed in a different order than described or are not performed at all. In some cases, steps may include additional features not mentioned below, or further steps may be added. In addition, while process flow 300 shows processes between UE 115-*b* and base station 105-*b*, it should be understood that these processes may occur between any number of network devices.

At 305, the UE 115-*b* may transmit, to the base station 105-*b*, an uplink message which indicates the capability of the UE 115-*b* to support RRM relaxation-based overheating assistance mitigation. For example, the capability may notify the base station 105-*b* that the UE 115-*a* may request RRM relaxation as part of a UE assistance information message.

At 310, the UE 115-*b* may determine that the operating temperature exceeds an overheating condition threshold temperature (e.g., the temperature of the UE 115-*a* is greater than a threshold temperature which indicates and overheating condition of the UE 115-*b*).

At 315, the UE 115-*b* may transmit an uplink control message (e.g., a UE assistance information message) to the base station 105-*b* in response to the overheating condition. The uplink message may indicate a request for the UE 115-*b* to reconfigure one or more measurement parameters to reduce the operating temperature of the UE 115-*b*. In some examples, the request to reconfigure the one or more measurement parameters may be formatted as an RRM relaxation information element.

In some examples, the request to reconfigure the one or more measurement parameters may be a request to reduce a number of measurement objects that are measured by the UE 115-*b*. For example, the measurement objects may be one or more intra-frequency cells, inter-frequency cells, or inter-RAT cells that are configured for monitoring by the UE 115-*b*. In some examples, the measurement objects may be configured for the UE 115-*b* based on RAT type.

In some examples, the request to reconfigure the one or more measurement parameters may be a request to reduce the periodicity in which the UE 115-*b* performs RRM measurements. For example, the UE 115-*b* may request to reduce the frequency that RRM measurements are performed, of the UE 115-*b* may request to increase the interval in which RRM measurements are performed.

In some examples, the request to reconfigure the one or more measurement parameters may be a request to apply a scaling factor to the one or more measurement parameters to reduce or increase the measurement frequency or duration. For example, the UE 115-*a* may request a scaling factor that decreases RRM measurements upon determining that an overheating threshold condition temperature is exceeded, and may request a scaling factor that increases RRM measurements upon recovering from overheating.

In some examples, the RRM relaxation information element may include a reason field which indicates a reason that the UE 115-*b* requests the reconfiguration of the one or more measurement parameters. For example, the reason field may include an indication that the UE 115-*b* has exceeded the overheating condition threshold temperature, or that the UE 115-*b* requests RRM relaxation for non-thermal mitigation (e.g., to reduce power consumption, to prevent overheating, etc.). In some other cases, the reason field may include a user preferred RRM relaxation reason.

At 320, the base station 105-*b* may receive the uplink control message from the UE 115-*b*, and may reconfigure one or more measurement parameters based on an operating temperature of the UE 115-*b* that exceeds an overheating condition threshold temperature. For example, the base station 105-*b* may configure a reduction in measurement objects for the UE 115-*b*, or the base station 105-*b* may reduce the periodicity for the UE 115-*b* to perform RRM measurements, or the base station 105-*b* may determine a scaling factor for the UE 115-*b* to apply to the one or more measurement parameters.

At 325, the base station 105-*b* may transmit the measurement reconfiguration to the UE 115-*b*, and the UE 115-*b* may implement the measurement reconfiguration. Once the UE 115-*b* has recovered from overheating, the UE 115-*b* may transmit a second uplink control message indicating that the UE 115-*b* may resume normal RRM measurements.

Figure 4:
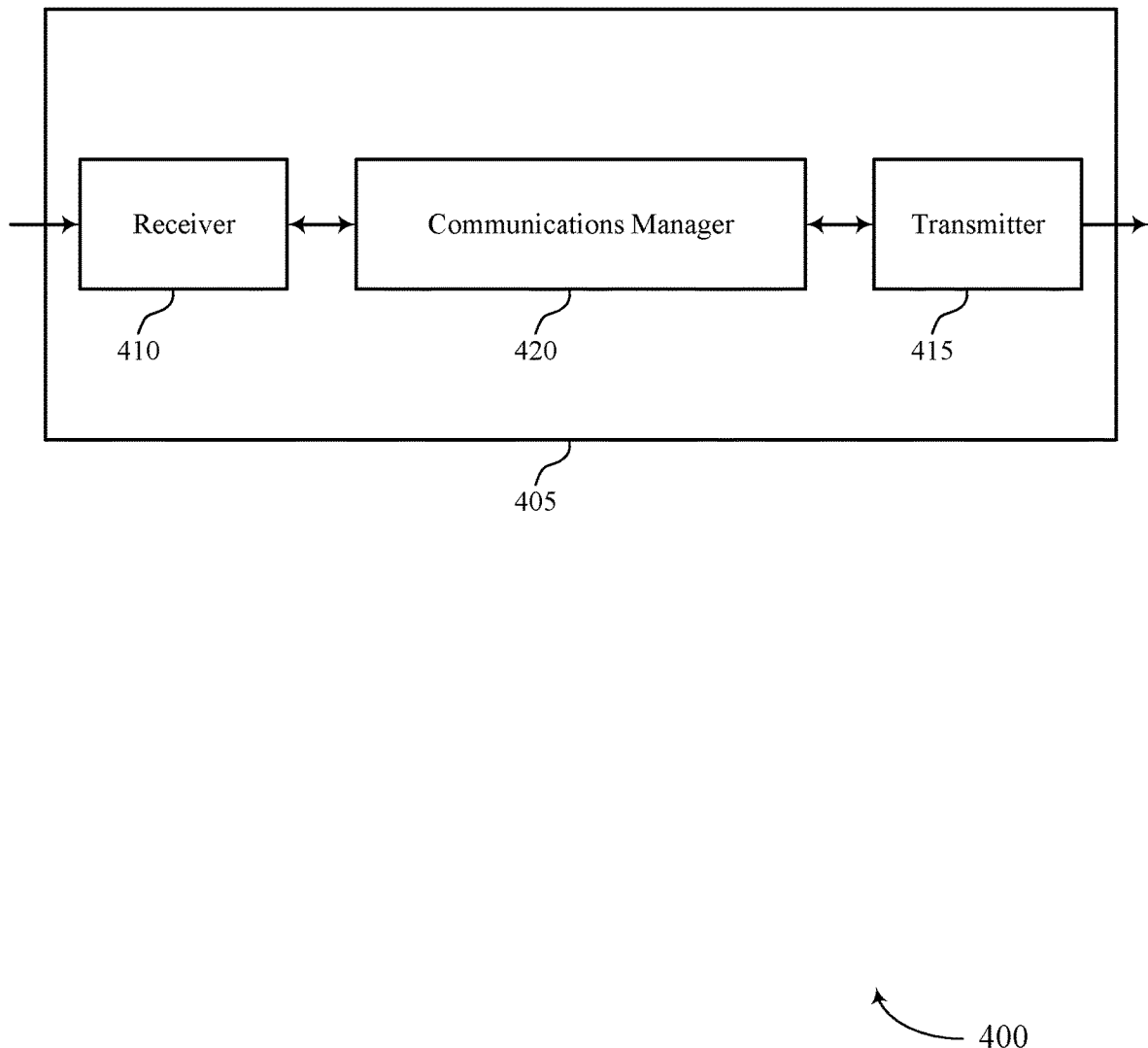
FIGS. 4 and 5 show block diagrams of devices that support overheating triggered RRM relaxation in accordance with aspects of the present disclosure.

FIG. 4 shows a block diagram 400 of a device 405 that supports overheating triggered RRM relaxation in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to overheating triggered RRM relaxation). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to overheating triggered RRM relaxation). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of overheating triggered RRM relaxation as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for determining that an operating temperature of the UE exceeds an overheating condition threshold temperature. The communications manager 420 may be configured as or otherwise support a means for transmitting, to a base station, an uplink control message indicating a request to reconfigure one or more measurement parameters based on the operating temperature. The communications manager 420 may be configured as or otherwise support a means for receiving, from the base station, a downlink control message indicating a reconfiguration of the one or more measurement parameters.

In some examples, communications manager 420 may be implemented as an integrated circuit or chipset for a mobile device modem, and the receiver 410 and transmitter 415 may be implemented as analog components (e.g., amplifiers, filters, and antennas) coupled with the mobile device modem to enable wireless transmission and reception.

The communications manager 420 as described herein may be implemented to realize one or more potential advantages. At least one implementation may enable communications manager 420 to effectively identify and overheating condition at the device 405, and format a request to reduce measurement parameters, among other overheating mitigation processes. In some implementations, the communications manager 420 may be able to identify that a reduction in RRM measurements may assist in lowering the operating temperature of the device 405.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced or simplified processing, reduced power consumption, performing a reduced number of measurements, and device-initiated overheating assistance processes.

Figure 5:
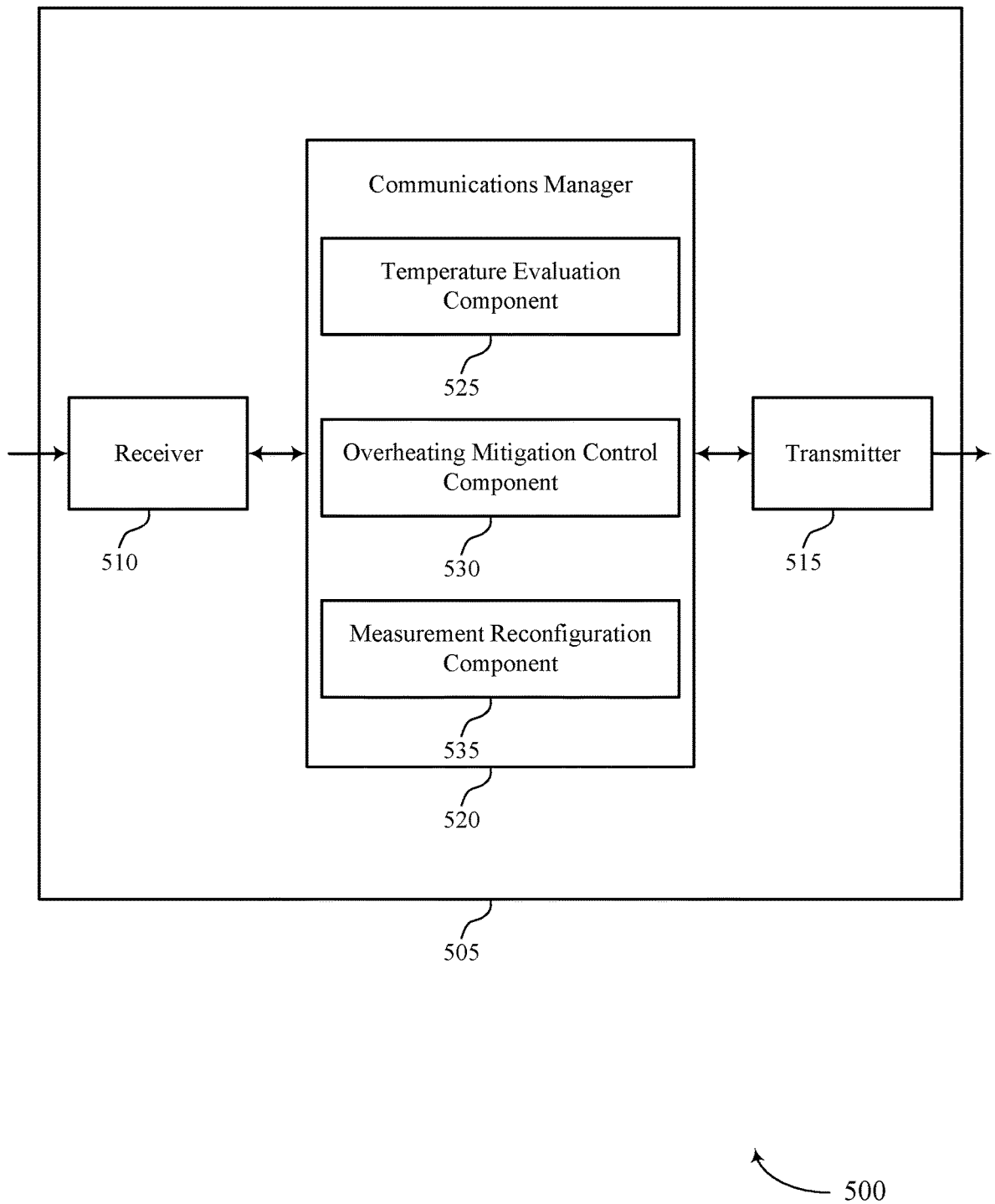

FIG. 5 shows a block diagram 500 of a device 505 that supports overheating triggered RRM relaxation in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to overheating triggered RRM relaxation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to overheating triggered RRM relaxation). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of overheating triggered RRM relaxation as described herein. For example, the communications manager 520 may include a temperature evaluation component 525, an overheating mitigation control component 530, a measurement reconfiguration component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The temperature evaluation component 525 may be configured as or otherwise support a means for determining that an operating temperature of the UE exceeds an overheating condition threshold temperature. The overheating mitigation control component 530 may be configured as or otherwise support a means for transmitting, to a base station, an uplink control message indicating a request to reconfigure one or more measurement parameters based on the operating temperature. The measurement reconfiguration component 535 may be configured as or otherwise support a means for receiving, from the base station, a downlink control message indicating a reconfiguration of the one or more measurement parameters.

Figure 6:
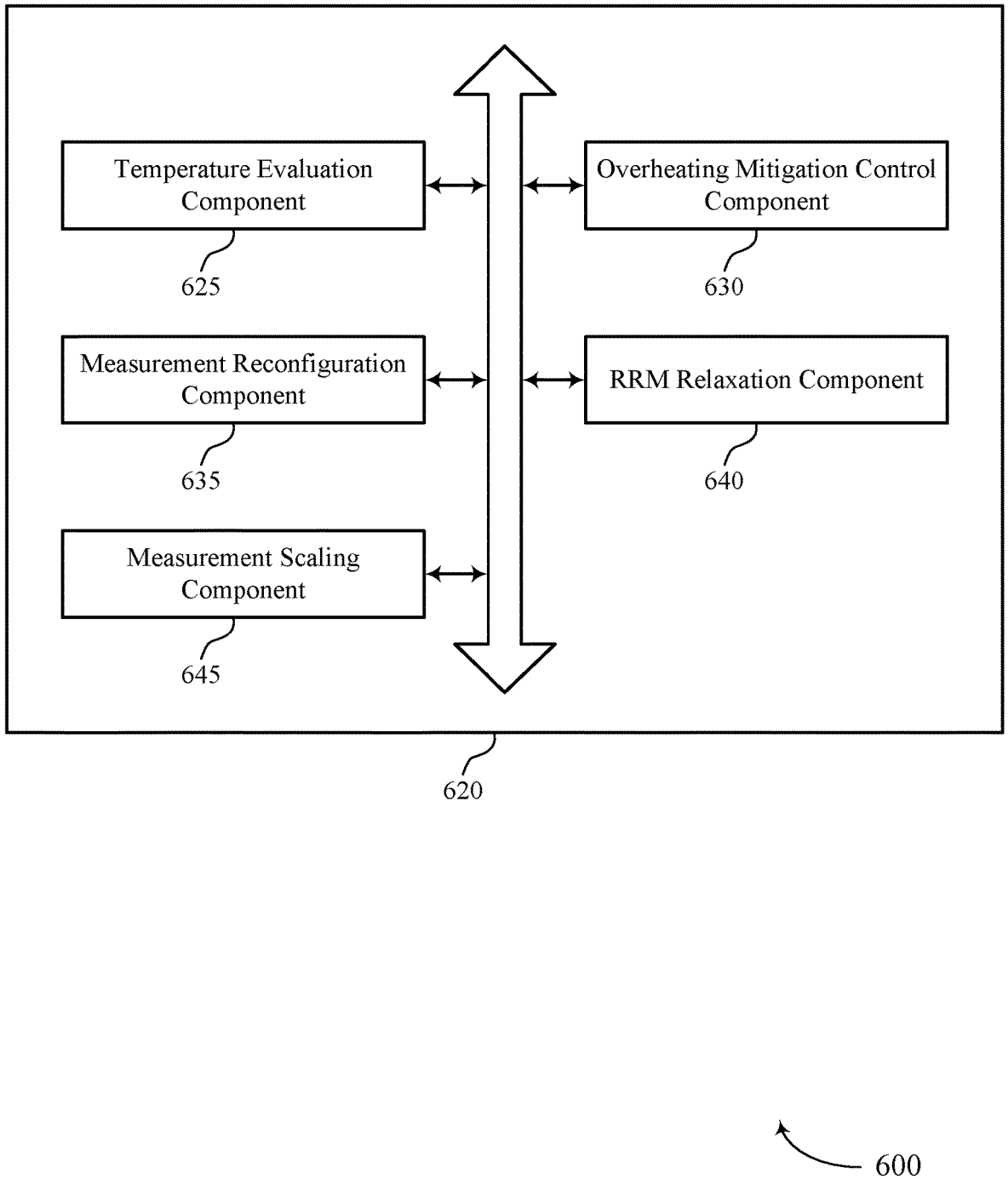
FIG. 6 shows a block diagram of a communications manager that supports overheating triggered RRM relaxation in accordance with aspects of the present disclosure.

FIG. 6 shows a block diagram 600 of a communications manager 620 that supports overheating triggered RRM relaxation in accordance with aspects of the present disclosure. The communications manager 620 may be an example of aspects of a communications manager 420, a communications manager 520, or both, as described herein. The communications manager 620, or various components thereof, may be an example of means for performing various aspects of overheating triggered RRM relaxation as described herein. For example, the communications manager 620 may include a temperature evaluation component 625, an overheating mitigation control component 630, a measurement reconfiguration component 635, an RRM relaxation component 640, a measurement scaling component 645, or any combination thereof. Each of these components may communicate, directly or indirectly, with one another (e.g., via one or more buses).

The communications manager 620 may support wireless communications at a UE in accordance with examples as disclosed herein. The temperature evaluation component 625 may be configured as or otherwise support a means for determining that an operating temperature of the UE exceeds an overheating condition threshold temperature. The overheating mitigation control component 630 may be configured as or otherwise support a means for transmitting, to a base station, an uplink control message indicating a request to reconfigure one or more measurement parameters based on the operating temperature. The measurement reconfiguration component 635 may be configured as or otherwise support a means for receiving, from the base station, a downlink control message indicating a reconfiguration of the one or more measurement parameters.

In some examples, the RRM relaxation component 640 may be configured as or otherwise support a means for transmitting, to the base station, a capability of the UE to support radio resource management relaxation-based overheating assistance mitigation.

In some examples, the uplink control message includes a field indicating a reason that the UE requests the reconfiguration of the one or more measurement parameters. In some examples, the field indicating the reason includes an indication that the UE has exceeded the overheating condition threshold temperature or a non-thermal mitigation request to reduce measurements.

In some examples, the request to reconfigure the one or more measurement parameters further includes a request to reduce a number of measurement objects that are measured by the UE. In some examples, the number of measurement objects include one or more intra-frequency cells or inter-frequency cells, or inter-RAT cells configured for monitoring by the UE. In some examples, the number of measurement objects are configured based on an associated radio access technology.

In some examples, the request to reconfigure the one or more measurement parameters further includes a request to reduce a periodicity of measurement based on the operating temperature. In some examples, to support request to reconfigure the one or more measurement parameters, the measurement scaling component 645 may be configured as or otherwise support a means for scaling the one or more measurement parameters in accordance with a measurement scaling factor. In some examples, the uplink control message includes a UE assistance information message. In some examples, the request to reconfigure the one or more measurement parameters includes a radio resource management relaxation information element.

In some examples, the temperature evaluation component 625 may be configured as or otherwise support a means for determining that the operating temperature of the UE is less than the overheating condition threshold temperature. In some examples, the temperature evaluation component 625 may be configured as or otherwise support a means for transmitting, to the base station, a second uplink control message indicating that the UE has recovered from overheating.

Figure 7:
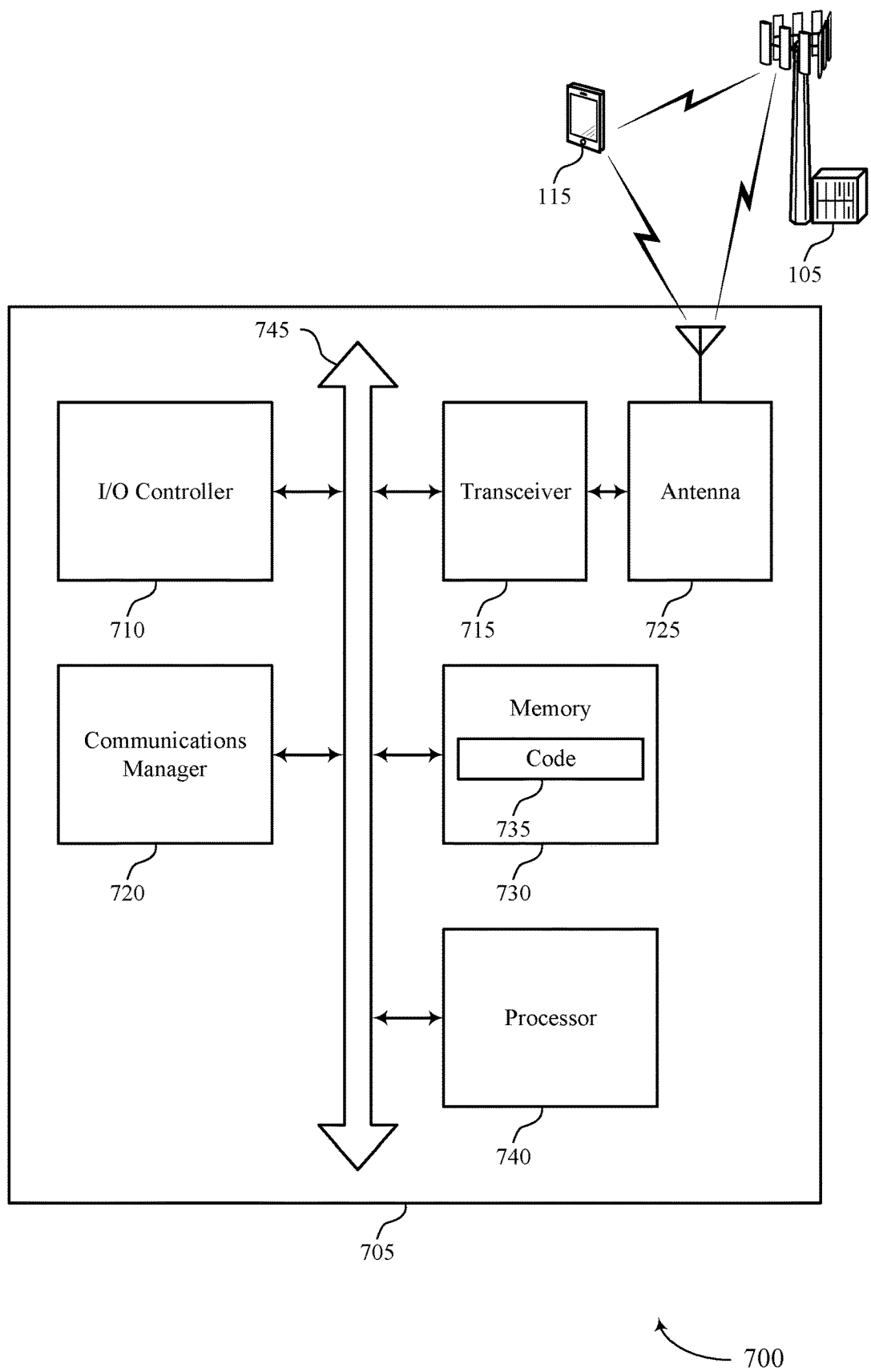
FIG. 7 shows a diagram of a system including a device that supports overheating triggered RRM relaxation in accordance with aspects of the present disclosure.

FIG. 7 shows a diagram of a system 700 including a device 705 that supports overheating triggered RRM relaxation in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting overheating triggered RRM relaxation). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for determining that an operating temperature of the UE exceeds an overheating condition threshold temperature. The communications manager 720 may be configured as or otherwise support a means for transmitting, to a base station, an uplink control message indicating a request to reconfigure one or more measurement parameters based on the operating temperature. The communications manager 720 may be configured as or otherwise support a means for receiving, from the base station, a downlink control message indicating a reconfiguration of the one or more measurement parameters.

By including or configuring the communications manager 720 in accordance with examples as described herein, the device 705 may support techniques for improved communication reliability, reduced latency, improved user experience related to reduced processing and reduced operating temperature, reduced power consumption, longer battery life due to reduced measurement, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of overheating triggered RRM relaxation as described herein, or the processor 740 and the memory 730 may be otherwise configured to perform or support such operations.

Figure 8:
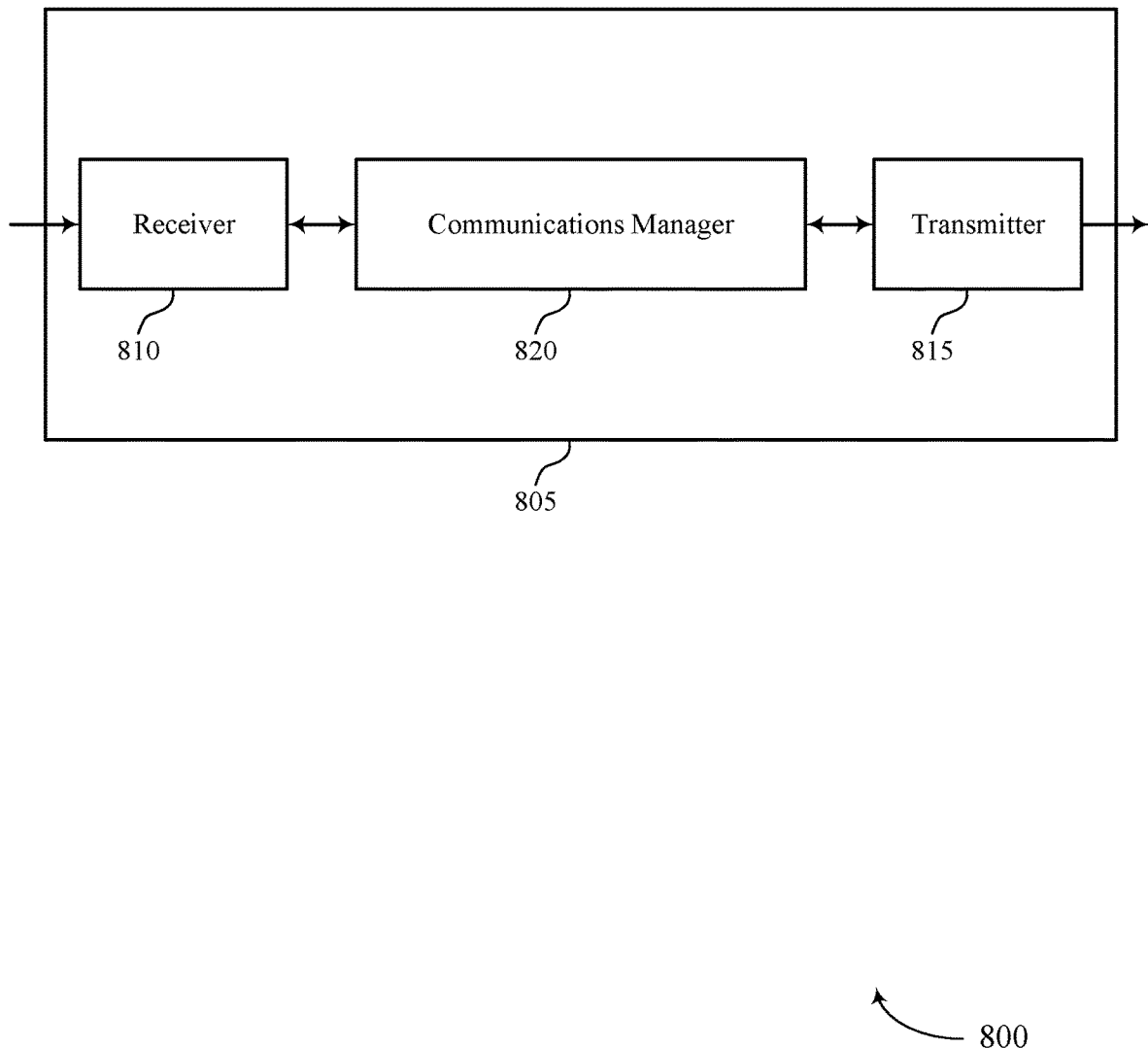
FIGS. 8 and 9 show block diagrams of devices that support overheating triggered RRM relaxation in accordance with aspects of the present disclosure.

FIG. 8 shows a block diagram 800 of a device 805 that supports overheating triggered RRM relaxation in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to overheating triggered RRM relaxation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to overheating triggered RRM relaxation). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of overheating triggered RRM relaxation as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for receiving, from a UE an uplink control message indicating a request to reconfigure one or more measurement parameters based on an operating temperature of the UE that exceeds an overheating condition threshold temperature. The communications manager 820 may be configured as or otherwise support a means for transmitting a downlink control message indicating a reconfiguration of the one or more measurement parameters in accordance with the request.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced or simplified processing, reduced power consumption, performing a reduced number of measurements, more effective overheating mitigation using device-initiated overheating assistance processes.

Figure 9:
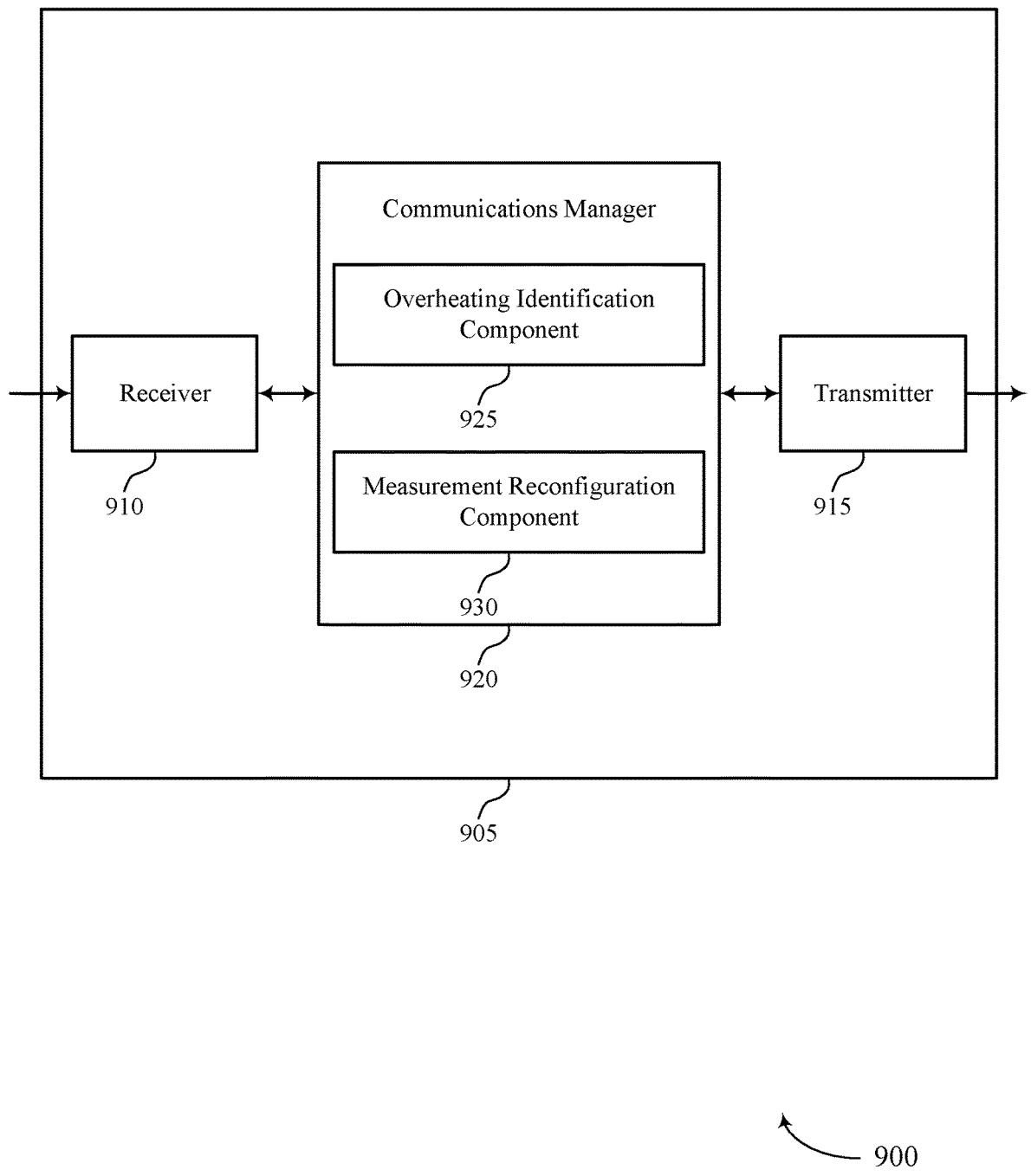

FIG. 9 shows a block diagram 900 of a device 905 that supports overheating triggered RRM relaxation in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to overheating triggered RRM relaxation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to overheating triggered RRM relaxation). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of overheating triggered RRM relaxation as described herein. For example, the communications manager 920 may include an overheating identification component 925 a measurement reconfiguration component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The overheating identification component 925 may be configured as or otherwise support a means for receiving, from a UE an uplink control message indicating a request to reconfigure one or more measurement parameters based on an operating temperature of the UE that exceeds an overheating condition threshold temperature. The measurement reconfiguration component 930 may be configured as or otherwise support a means for transmitting a downlink control message indicating a reconfiguration of the one or more measurement parameters in accordance with the request.

Figure 10:
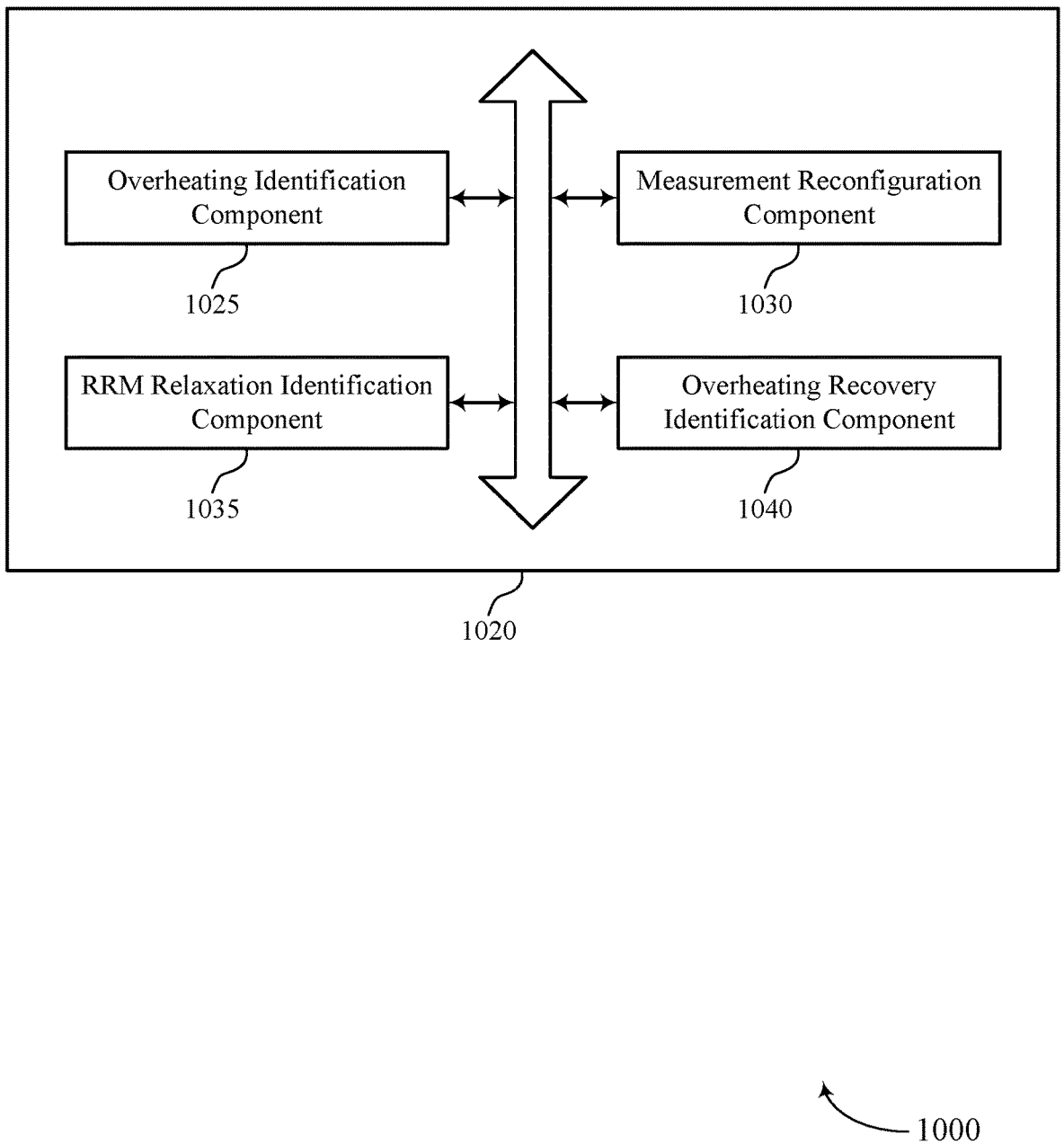
FIG. 10 shows a block diagram of a communications manager that supports overheating triggered RRM relaxation in accordance with aspects of the present disclosure.

FIG. 10 shows a block diagram 1000 of a communications manager 1020 that supports overheating triggered RRM relaxation in accordance with aspects of the present disclosure. The communications manager 1020 may be an example of aspects of a communications manager 820, a communications manager 920, or both, as described herein. The communications manager 1020, or various components thereof, may be an example of means for performing various aspects of overheating triggered RRM relaxation as described herein. For example, the communications manager 1020 may include an overheating identification component 1025, a measurement reconfiguration component 1030, an RRM relaxation identification component 1035, an overheating recovery identification component 1040, or any combination thereof. Each of these components may communicate, directly or indirectly, with one another (e.g., via one or more buses).

The communications manager 1020 may support wireless communications at a base station in accordance with examples as disclosed herein. The overheating identification component 1025 may be configured as or otherwise support a means for receiving, from a UE an uplink control message indicating a request to reconfigure one or more measurement parameters based on an operating temperature of the UE that exceeds an overheating condition threshold temperature. The measurement reconfiguration component 1030 may be configured as or otherwise support a means for transmitting a downlink control message indicating a reconfiguration of the one or more measurement parameters in accordance with the request.

In some examples, the RRM relaxation identification component 1035 may be configured as or otherwise support a means for receiving, from the UE, a capability of the UE to support radio resource management relaxation-based overheating assistance mitigation.

In some examples, the uplink control message includes a field indicating a reason that the UE requests the reconfiguration of the one or more measurement parameters. In some examples, the field indicating the reason includes an indication that the UE has exceeded the overheating condition threshold temperature or a non-thermal mitigation request to reduce measurements.

In some examples, the reconfiguration of the one or more measurement parameters further includes an indication to reduce a number of measurement objects that are measured by the UE. In some examples, the number of measurement objects include one or more intra-frequency cells or inter-frequency cells configured by the base station for monitoring by the UE. In some examples, the number of measurement objects are configured by the base station based on a radio access technology supported by the base station.

In some examples, the reconfiguration of the one or more measurement parameters further includes an indication to reduce a periodicity of measurement based on the operating temperature. In some examples, the reconfiguration of the one or more measurement parameters further includes a measurement scaling factor to scale the one or more measurement parameters at the UE. In some examples, the downlink control message further includes one or more overheating assistance parameters indicating a reduced bandwidth, a reduced number of multiple-input multiple-output layers, a reduced number of component carriers, or any combination thereof. In some examples, the uplink control message includes a UE assistance information message. In some examples, the reconfiguration of the one or more measurement parameters includes a radio resource management relaxation information element.

In some examples, the overheating recovery identification component 1040 may be configured as or otherwise support a means for receiving, from the UE, a second uplink control message indicating that the UE has recovered from overheating.

Figure 11:
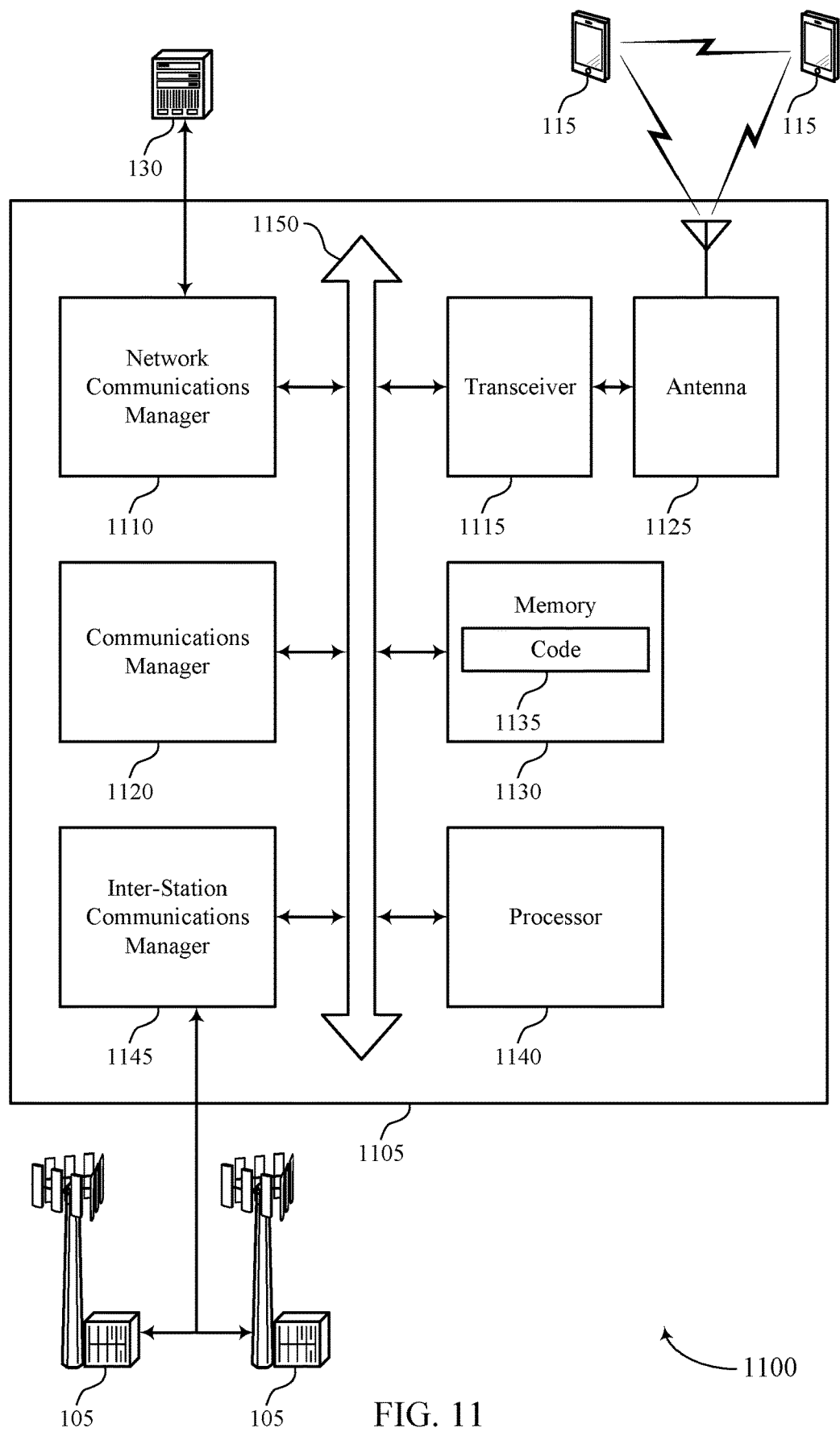
FIG. 11 shows a diagram of a system including a device that supports overheating triggered RRM relaxation in accordance with aspects of the present disclosure.

FIG. 11 shows a diagram of a system 1100 including a device 1105 that supports overheating triggered RRM relaxation in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting overheating triggered RRM relaxation). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for receiving, from a UE an uplink control message indicating a request to reconfigure one or more measurement parameters based on an operating temperature of the UE that exceeds an overheating condition threshold temperature. The communications manager 1120 may be configured as or otherwise support a means for transmitting a downlink control message indicating a reconfiguration of the one or more measurement parameters in accordance with the request.

By including or configuring the communications manager 1120 in accordance with examples as described herein, the device 1105 may support techniques for improved communication reliability, reduced latency, improved user experience related to reduced processing and reduced operating temperature, reduced power consumption, improved coordination between devices, longer battery life due to reduced measurement, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of overheating triggered RRM relaxation as described herein, or the processor 1140 and the memory 1130 may be otherwise configured to perform or support such operations.

Figure 12:
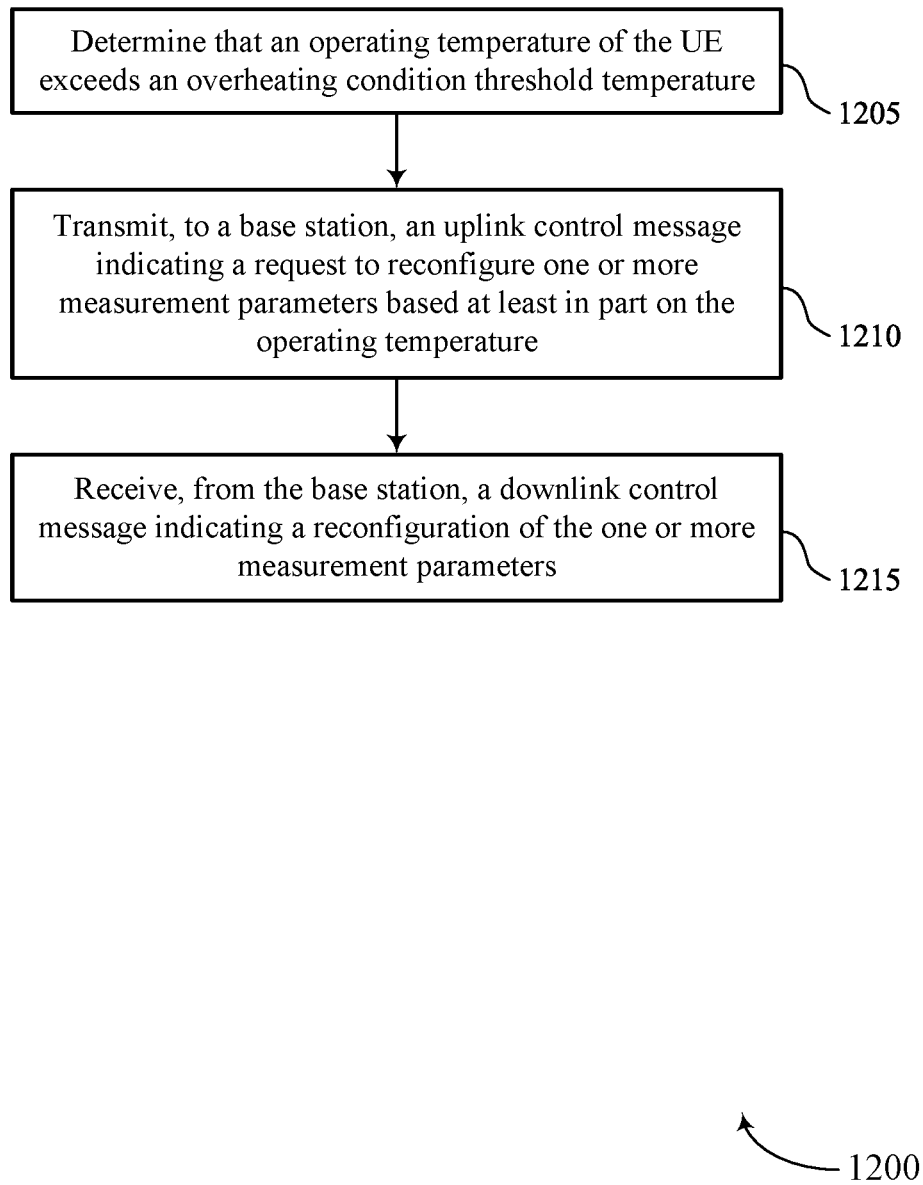
FIGS. 12 through 15 show flowcharts illustrating methods that support overheating triggered RRM relaxation in accordance with aspects of the present disclosure.

FIG. 12 shows a flowchart illustrating a method 1200 that supports overheating triggered RRM relaxation in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include determining that an operating temperature of the UE exceeds an overheating condition threshold temperature. The operations of 1205 may be performed in accordance with examples as disclosed herein. In some examples, aspects of the operations of 1205 may be performed by a temperature evaluation component 625 as described with reference to FIG. 6.

At 1210, the method may include transmitting, to a base station, an uplink control message indicating a request to reconfigure one or more measurement parameters based on the operating temperature. The operations of 1210 may be performed in accordance with examples as disclosed herein. In some examples, aspects of the operations of 1210 may be performed by an overheating mitigation control component 630 as described with reference to FIG. 6.

At 1215, the method may include receiving, from the base station, a downlink control message indicating a reconfiguration of the one or more measurement parameters. The operations of 1215 may be performed in accordance with examples as disclosed herein. In some examples, aspects of the operations of 1215 may be performed by a measurement reconfiguration component 635 as described with reference to FIG. 6.

Figure 13:
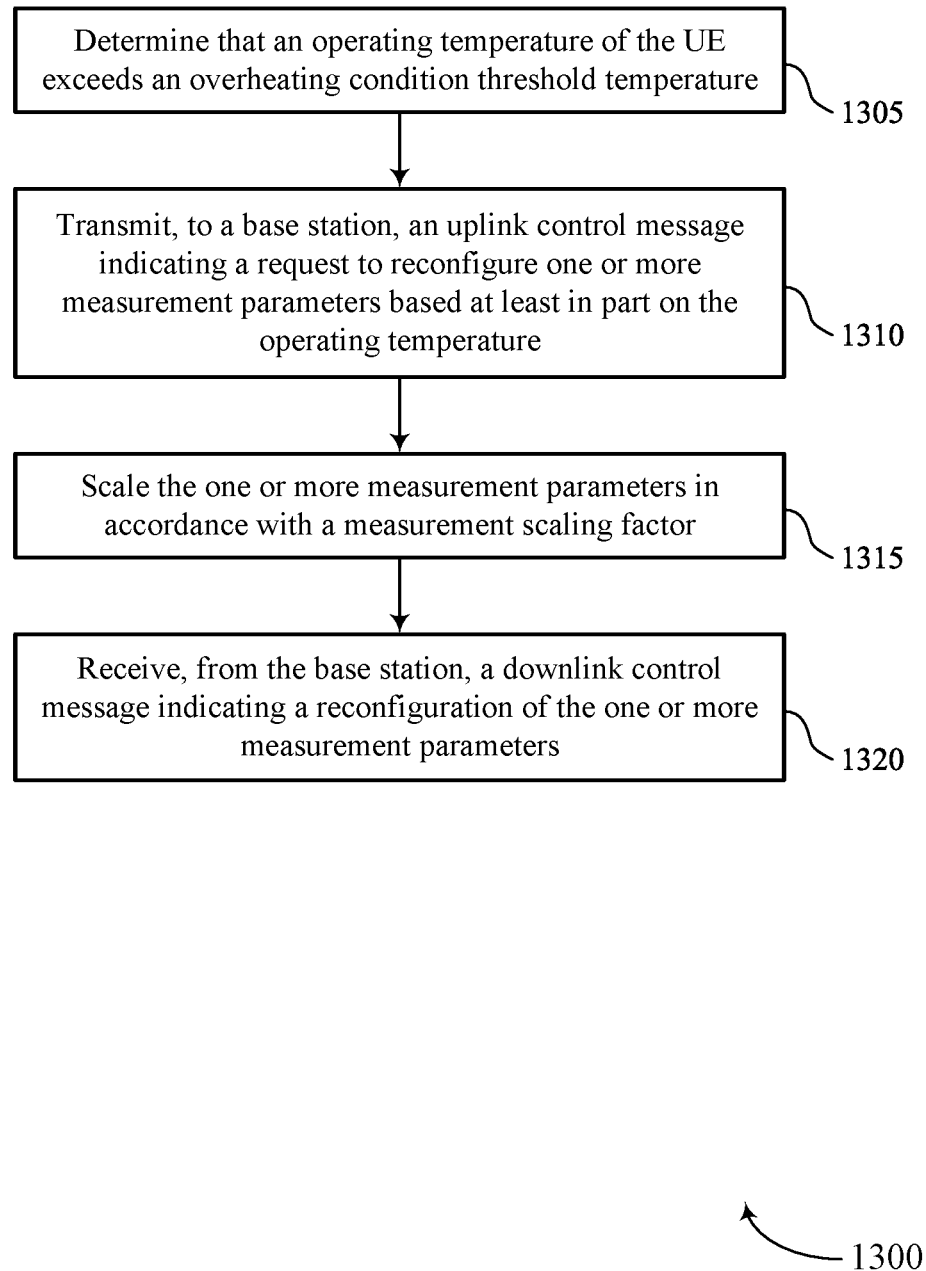

FIG. 13 shows a flowchart illustrating a method 1300 that supports overheating triggered RRM relaxation in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include determining that an operating temperature of the UE exceeds an overheating condition threshold temperature. The operations of 1305 may be performed in accordance with examples as disclosed herein. In some examples, aspects of the operations of 1305 may be performed by a temperature evaluation component 625 as described with reference to FIG. 6.

At 1310, the method may include transmitting, to a base station, an uplink control message indicating a request to reconfigure one or more measurement parameters based on the operating temperature. The operations of 1310 may be performed in accordance with examples as disclosed herein. In some examples, aspects of the operations of 1310 may be performed by an overheating mitigation control component 630 as described with reference to FIG. 6.

At 1315, the method may include scaling the one or more measurement parameters in accordance with a measurement scaling factor. The operations of 1315 may be performed in accordance with examples as disclosed herein. In some examples, aspects of the operations of 1315 may be performed by a measurement scaling component 645 as described with reference to FIG. 6.

At 1320, the method may include receiving, from the base station, a downlink control message indicating a reconfiguration of the one or more measurement parameters. The operations of 1320 may be performed in accordance with examples as disclosed herein. In some examples, aspects of the operations of 1320 may be performed by a measurement reconfiguration component 635 as described with reference to FIG. 6.

Figure 14:
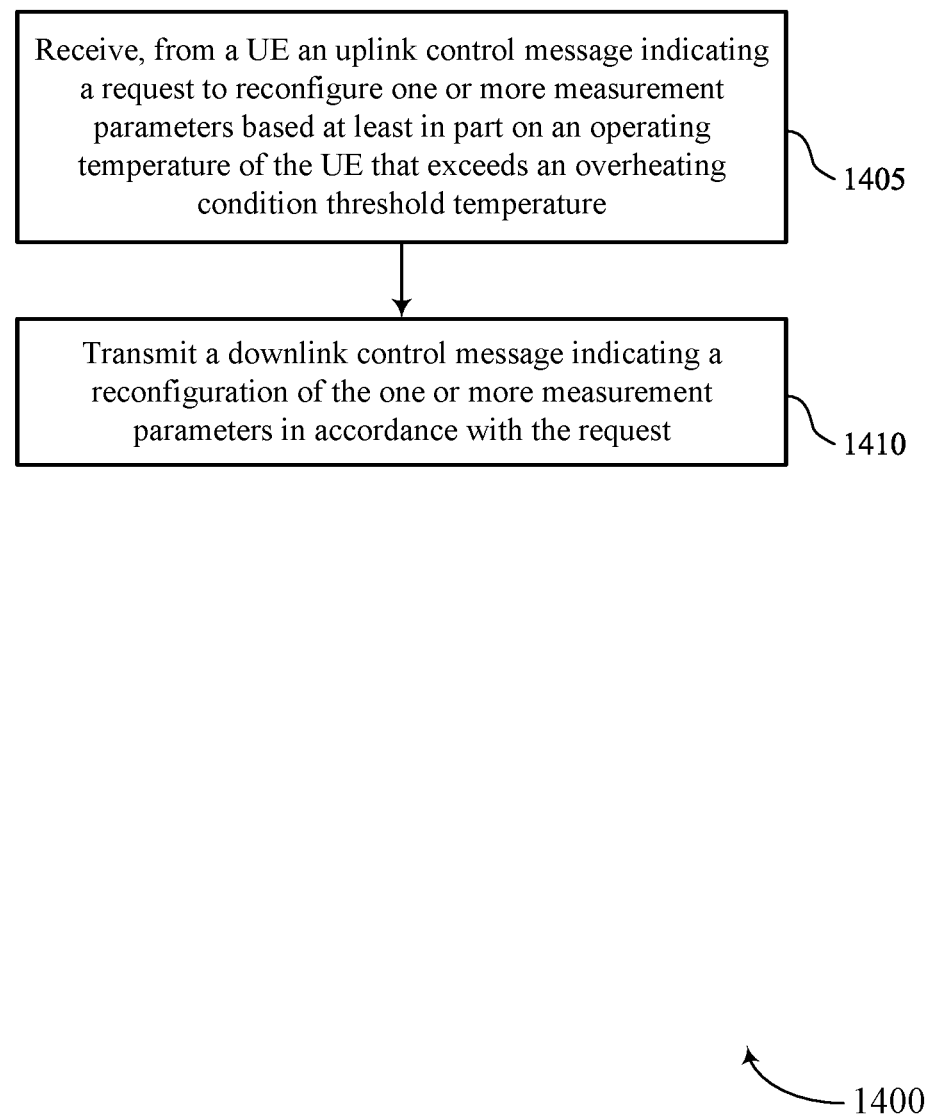

FIG. 14 shows a flowchart illustrating a method 1400 that supports overheating triggered RRM relaxation in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include receiving, from a UE an uplink control message indicating a request to reconfigure one or more measurement parameters based on an operating temperature of the UE that exceeds an overheating condition threshold temperature. The operations of 1405 may be performed in accordance with examples as disclosed herein. In some examples, aspects of the operations of 1405 may be performed by an overheating identification component 1025 as described with reference to FIG. 10.

At 1410, the method may include transmitting a downlink control message indicating a reconfiguration of the one or more measurement parameters in accordance with the request. The operations of 1410 may be performed in accordance with examples as disclosed herein. In some examples, aspects of the operations of 1410 may be performed by a measurement reconfiguration component 1030 as described with reference to FIG. 10.

Figure 15:
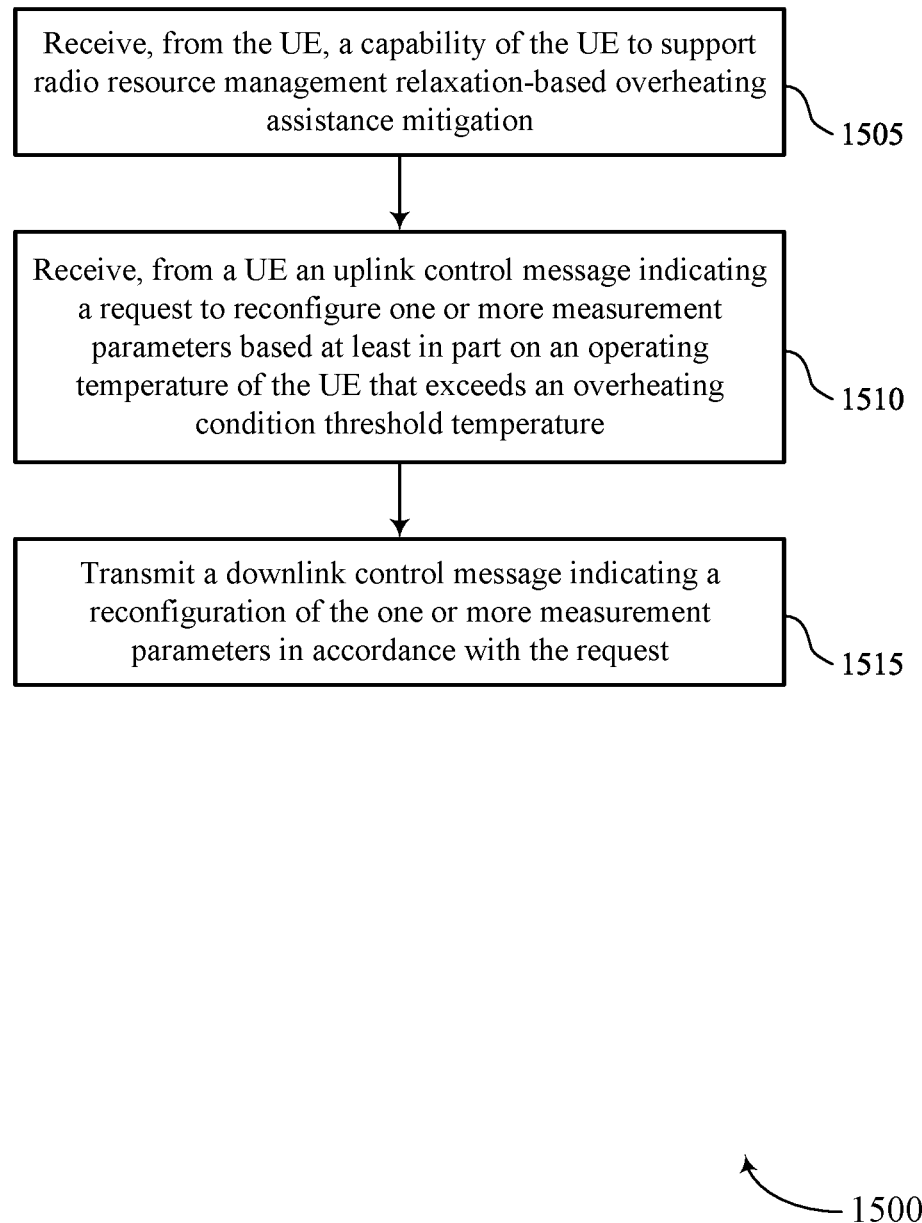

FIG. 15 shows a flowchart illustrating a method 1500 that supports overheating triggered RRM relaxation in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include receiving, from the UE, a capability of the UE to support radio resource management relaxation-based overheating assistance mitigation. The operations of 1505 may be performed in accordance with examples as disclosed herein. In some examples, aspects of the operations of 1505 may be performed by an RRM relaxation identification component 1035 as described with reference to FIG. 10.

At 1510, the method may include receiving, from a UE an uplink control message indicating a request to reconfigure one or more measurement parameters based on an operating temperature of the UE that exceeds an overheating condition threshold temperature. The operations of 1510 may be performed in accordance with examples as disclosed herein. In some examples, aspects of the operations of 1510 may be performed by an overheating identification component 1025 as described with reference to FIG. 10.

At 1515, the method may include transmitting a downlink control message indicating a reconfiguration of the one or more measurement parameters in accordance with the request. The operations of 1515 may be performed in accordance with examples as disclosed herein. In some examples, aspects of the operations of 1515 may be performed by a measurement reconfiguration component 1030 as described with reference to FIG. 10.

The following provides an overview of aspects of the present disclosure:

Aspect 1: A method for wireless communications at a UE, comprising: determining that an operating temperature of the UE exceeds an overheating condition threshold temperature; transmitting, to a base station, an uplink control message indicating a request to reconfigure one or more measurement parameters based at least in part on the operating temperature; and receiving, from the base station, a downlink control message indicating a reconfiguration of the one or more measurement parameters.

Aspect 2: The method of aspect 1, further comprising: transmitting, to the base station, a capability of the UE to support radio resource management relaxation-based overheating assistance mitigation.

Aspect 3: The method of any of aspects 1 through 2, wherein the uplink control message comprises a field indicating a reason that the UE requests the reconfiguration of the one or more measurement parameters.

Aspect 4: The method of aspect 3, wherein the field indicating the reason comprises an indication that the UE has exceeded the overheating condition threshold temperature or a non-thermal mitigation request to reduce measurements.

Aspect 5: The method of any of aspects 1 through 4, wherein the request to reconfigure the one or more measurement parameters further comprises a request to reduce a number of measurement objects that are measured by the UE.

Aspect 6: The method of aspect 5, wherein the number of measurement objects comprise one or more intra-frequency cells or inter-frequency cells or inter-RAT cells configured for monitoring by the UE.

Aspect 7: The method of any of aspects 5 through 6, wherein the number of measurement objects are configured based at least in part on an associated radio access technology.

Aspect 8: The method of any of aspects 1 through 7, wherein the request to reconfigure the one or more measurement parameters further comprises a request to reduce a periodicity of measurement based at least in part on the operating temperature.

Aspect 9: The method of any of aspects 1 through 8, wherein the request to reconfigure the one or more measurement parameters further comprises: scaling the one or more measurement parameters in accordance with a measurement scaling factor.

Aspect 10: The method of any of aspects 1 through 9, wherein the uplink control message comprises a UE assistance information message.

Aspect 11: The method of any of aspects 1 through 10, wherein the request to reconfigure the one or more measurement parameters comprises a radio resource management relaxation information element.

Aspect 12: The method of any of aspects 1 through 11, further comprising: determining that the operating temperature of the UE is less than the overheating condition threshold temperature; and transmitting, to the base station, a second uplink control message indicating that the UE has recovered from overheating.

Aspect 13: A method for wireless communications at a base station, comprising: receiving, from a UE an uplink control message indicating a request to reconfigure one or more measurement parameters based at least in part on an operating temperature of the UE that exceeds an overheating condition threshold temperature; and transmitting a downlink control message indicating a reconfiguration of the one or more measurement parameters in accordance with the request.

Aspect 14: The method of aspect 13, further comprising: receiving, from the UE, a capability of the UE to support radio resource management relaxation-based overheating assistance mitigation.

Aspect 15: The method of any of aspects 13 through 14, wherein the uplink control message comprises a field indicating a reason that the UE requests the reconfiguration of the one or more measurement parameters.

Aspect 16: The method of aspect 15, wherein the field indicating the reason comprises an indication that the UE has exceeded the overheating condition threshold temperature or a non-thermal mitigation request to reduce measurements.

Aspect 17: The method of any of aspects 13 through 16, wherein the reconfiguration of the one or more measurement parameters further comprises an indication to reduce a number of measurement objects that are measured by the UE.

Aspect 18: The method of aspect 17, wherein the number of measurement objects comprise one or more intra-frequency cells or inter-frequency cells configured by the base station for monitoring by the UE.

Aspect 19: The method of any of aspects 17 through 18, wherein the number of measurement objects are configured by the base station based at least in part on a radio access technology supported by the base station.

Aspect 20: The method of any of aspects 13 through 19, wherein the reconfiguration of the one or more measurement parameters further comprises an indication to reduce a periodicity of measurement based at least in part on the operating temperature.

Aspect 21: The method of any of aspects 13 through 20, wherein the reconfiguration of the one or more measurement parameters further comprises a measurement scaling factor to scale the one or more measurement parameters at the UE.

Aspect 22: The method of any of aspects 13 through 21, wherein the downlink control message further comprises one or more overheating assistance parameters indicating a reduced bandwidth, a reduced number of multiple-input multiple-output layers, a reduced number of component carriers, or any combination thereof.

Aspect 23: The method of any of aspects 13 through 22, wherein the uplink control message comprises a UE assistance information message.

Aspect 24: The method of any of aspects 13 through 23, wherein the reconfiguration of the one or more measurement parameters comprises a radio resource management relaxation information element.

Aspect 25: The method of any of aspects 13 through 24, further comprising: receiving, from the UE, a second uplink control message indicating that the UE has recovered from overheating.

Aspect 26: An apparatus for wireless communications at a UE, comprising a processor; memory coupled with the processor; and instructions stored in the memory and executable by the processor to cause the apparatus to perform a method of any of aspects 1 through 12.

Aspect 27: An apparatus for wireless communications at a UE, comprising at least one means for performing a method of any of aspects 1 through 12.

Aspect 28: A non-transitory computer-readable medium storing code for wireless communications at a UE, the code comprising instructions executable by a processor to perform a method of any of aspects 1 through 12.

Aspect 29: An apparatus for wireless communications at a base station, comprising a processor; memory coupled with the processor; and instructions stored in the memory and executable by the processor to cause the apparatus to perform a method of any of aspects 13 through 25.

Aspect 30: An apparatus for wireless communications at a base station, comprising at least one means for performing a method of any of aspects 13 through 25.

Aspect 31: A non-transitory computer-readable medium storing code for wireless communications at a base station, the code comprising instructions executable by a processor to perform a method of any of aspects 13 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    determining that an operating temperature of the UE exceeds an overheating condition threshold temperature;
    transmitting, an uplink control message comprising a radio resource management relaxation information element that indicates a request to reconfigure one or more measurement parameters based at least in part on the operating temperature; and
    receiving a downlink control message indicating a reconfiguration of the one or more measurement parameters.

2. The method of claim 1, further comprising:
    transmitting a capability of the UE to support radio resource management relaxation-based overheating assistance mitigation.

3. The method of claim 1, wherein the uplink control message comprises a field indicating a reason that the UE requests the reconfiguration of the one or more measurement parameters.

4. The method of claim 3, wherein the field indicating the reason comprises an indication that the UE has exceeded the overheating condition threshold temperature or a non-thermal mitigation request to reduce measurements.

5. The method of claim 1, wherein the request to reconfigure the one or more measurement parameters further comprises a request to reduce a quantity of measurement objects that the UE measures.

6. The method of claim 5, wherein the number quantity of measurement objects comprise one or more intra-frequency cells or inter-frequency cells or inter-RAT cells configured for the UE to monitor.

7. The method of claim 5, wherein the quantity of measurement objects are configured based at least in part on an associated radio access technology.

8. The method of claim 1, wherein the request to reconfigure the one or more measurement parameters further comprises a request to reduce a periodicity of measurement based at least in part on the operating temperature.

9. The method of claim 1, wherein the request to reconfigure the one or more measurement parameters further comprises:
    scaling the one or more measurement parameters in accordance with a measurement scaling factor.

10. The method of claim 1, wherein the uplink control message comprises a UE assistance information message.

11. The method of claim 1, further comprising:
    determining that the operating temperature of the UE is less than the overheating condition threshold temperature; and
    transmitting a second uplink control message indicating that the UE has recovered from overheating.

12. A method for wireless communications at a network device, comprising:
    receiving, from a user equipment (UE) an uplink control message comprising a radio resource management relaxation information element that indicates a request to reconfigure one or more measurement parameters based at least in part on an operating temperature of the UE that exceeds an overheating condition threshold temperature; and
    transmitting a downlink control message indicating a reconfiguration of the one or more measurement parameters in accordance with the request.

13. The method of claim 12, further comprising:
    receiving, from the UE, a capability of the UE to support radio resource management relaxation-based overheating assistance mitigation.

14. The method of claim 12, wherein the uplink control message comprises a field indicating a reason that the UE requests the reconfiguration of the one or more measurement parameters.

15. The method of claim 14, wherein the field indicating the reason comprises an indication that the UE has exceeded the overheating condition threshold temperature or a non-thermal mitigation request to reduce measurements.

16. The method of claim 12, wherein the reconfiguration of the one or more measurement parameters further comprises an indication to reduce a quantity of measurement objects that the UE measures.

17. The method of claim 16, wherein the quantity of measurement objects comprise one or more intra-frequency cells or inter-frequency cells configured for the UE to monitor.

18. The method of claim 16, wherein the quantity of measurement objects is based at least in part on a supported radio access technology.

19. The method of claim 12, wherein the reconfiguration of the one or more measurement parameters further comprises an indication to reduce a periodicity of measurement based at least in part on the operating temperature.

20. The method of claim 12, wherein the reconfiguration of the one or more measurement parameters further comprises a measurement scaling factor to scale the one or more measurement parameters at the UE.

21. The method of claim 12, wherein the downlink control message further comprises one or more overheating assistance parameters indicating a reduced bandwidth, a reduced quantity of multiple-input multiple-output layers, a reduced quantity of component carriers, or any combination thereof.

22. The method of claim 12, wherein the uplink control message comprises a UE assistance information message.

23. The method of claim 12, further comprising:
    receiving, from the UE, a second uplink control message indicating that the UE has recovered from overheating.

24. An apparatus for wireless communications at a user equipment (UE), comprising:
    a processor;
    memory coupled with the processor; and
    instructions stored in the memory and executable by the processor to cause the apparatus to:
        determine that an operating temperature of the UE exceeds an overheating condition threshold temperature;
        transmit an uplink control message comprising a radio resource management relaxation information element that indicates a request to reconfigure one or more measurement parameters based at least in part on the operating temperature; and
        receive a downlink control message indicating a reconfiguration of the one or more measurement parameters.

25. The apparatus of claim 24, wherein the instructions are further executable by the processor to cause the apparatus to:
  transmit a capability of the UE to support radio resource management relaxation-based overheating assistance mitigation.

26. The apparatus of claim 24, wherein the uplink control message comprises a field indicating a reason that the UE requests the reconfiguration of the one or more measurement parameters.

27. The apparatus of claim 26, wherein the field indicating the reason comprises an indication that the UE has exceeded the overheating condition threshold temperature or a non-thermal mitigation request to reduce measurements.

28. An apparatus for wireless communications at a network device, comprising:
  a processor;
  memory coupled with the processor; and
  instructions stored in the memory and executable by the processor to cause the apparatus to:
    receive, from a user equipment (UE) an uplink control message comprising a radio resource management relaxation information element that indicates a request to reconfigure one or more measurement parameters based at least in part on an operating temperature of the UE that exceeds an overheating condition threshold temperature; and
    transmit a downlink control message indicating a reconfiguration of the one or more measurement parameters in accordance with the request.

* * * * *